US012575573B2

(12) United States Patent
Buchert et al.

(10) Patent No.: US 12,575,573 B2
(45) Date of Patent: *Mar. 17, 2026

(54) METHODS OF USING A COLLOIDAL SILVER-BASED COMPOSITION IN REDUCING OR PREVENTING MICROBIAL CONTAMINATION IN PLANTS OR EXPLANTS IN TISSUE CULTURE PROCESSES

(71) Applicant: ClearLeaf Inc., Wilmington, DE (US)

(72) Inventors: Agustin Buchert, San Jose (CR); Robin A. Wiscovitch, Green Cove Springs, FL (US); Lawrence Pratt, Miami, FL (US)

(73) Assignee: ClearLeaf Inc., Wilmington, DE (US)

( * ) Notice: Subject to any disclaimer, the term of this patent is extended or adjusted under 35 U.S.C. 154(b) by 668 days.

This patent is subject to a terminal disclaimer.

(21) Appl. No.: 17/759,390

(22) PCT Filed: Jan. 15, 2021

(86) PCT No.: PCT/IB2021/050302
§ 371 (c)(1),
(2) Date: Jul. 25, 2022

(87) PCT Pub. No.: WO2021/148914
PCT Pub. Date: Jul. 29, 2021

(65) Prior Publication Data
US 2023/0084946 A1 Mar. 16, 2023

Related U.S. Application Data

(60) Provisional application No. 62/964,807, filed on Jan. 23, 2020.

(51) Int. Cl.
| | |
|---|---|
| *A01N 59/16* | (2006.01) |
| *A01N 25/04* | (2006.01) |
| *A01N 31/14* | (2006.01) |
| *A01P 3/00* | (2006.01) |

(52) U.S. Cl.
CPC ............. *A01N 59/16* (2013.01); *A01N 25/04* (2013.01); *A01N 31/14* (2013.01); *A01P 3/00* (2021.08)

(58) Field of Classification Search
CPC ........ A01N 59/16; A01N 25/04; A01N 31/14; A01P 3/00; A01P 1/00
See application file for complete search history.

(56) References Cited

U.S. PATENT DOCUMENTS

| | | | |
|---|---|---|---|
| 12,144,354 B2 * | 11/2024 | Buchert ................. | A01N 59/16 |
| 2003/0004065 A1 | 1/2003 | Belmonte | |
| 2010/0136148 A1 | 6/2010 | Saint Victor | |
| 2013/0071933 A1 * | 3/2013 | Curtis .................... | A01H 4/005 435/430 |
| 2016/0081347 A1 | 3/2016 | Niedermeyer | |

FOREIGN PATENT DOCUMENTS

| | | |
|---|---|---|
| CN | 101677560 A | 3/2010 |
| CN | 104073462 A | 10/2014 |
| CN | 106942274 A | 7/2017 |
| RU | 2577995 C1 | 3/2016 |
| WO | 2019087884 A1 | 5/2019 |
| WO | 2020201814 A1 | 10/2020 |

OTHER PUBLICATIONS

Nasser Mahna, Sepideh Zununi Vahed and Sajjad Khani, "Plant In vitro Culture goes Nano: Nanosilver-Mediated Decontamination of Ex vitro Explants", Journal of Nanomedicine and Nanotechology, 2013, 4(2), 1-4 (Year: 2013).*
J. Helmlinger, C. Sengstock, C. Groß-Heitfeld, C. Mayer, T. A. Schildhauer, M. Koller and M. Epple, "Silver nanoparticles with different size and shape: equal cytotoxicity, but different antibacterial effects", RSC Advances, 2016, 6, 18490-18501 (Year: 2016).*
S. Leelavathy and P. Deepa Sankar, "Curbing the Menace of Contamination in Plant Tissue Culture", Journal of Pure and Applied Microbiology, Sep. 2016. vol. 10(3), p. 2145-2152 (Year: 2016).*
Maity, D. et al., "In Situ Synthesis, Characterization, and Antimicrobial Activity of Silver Nanoparticles Using Water Soluble Polymer," Journal of Applied Polymer Science (2011); 122: pp. 2189-2196.
Safavi et al., "The Study of Nano Silver (NS) Antimicrobial Activity and Evaluation of Using NS in Tissue Culture Media," IPCBEE (2011); 3: 159-161.
Lee, M. H. et al., "Preparatio nof silver nanoparticles in hexagonal phase formed by nonionic Trion X-100 surfactant," Colloids and Surfaces (2002); 210: pp. 49-60.
Park, H. J. et al., "A New Composition of Nanosized Silica-Silver for Control of Various Plant Diseases," Plant Pathol. J. (2006); 22(3): pp. 295-302.

* cited by examiner

*Primary Examiner* — Mina Haghighatian
*Assistant Examiner* — Nathan W Schlientz
(74) *Attorney, Agent, or Firm* — Fox Rothschild LLP

(57) ABSTRACT

This disclosure provides methods of using an eco-friendly colloidal silver-based composition in preventing and reducing contamination caused by microorganisms in the plant tissue culture processes. The composition comprises colloidal silver, a copolymer, surfactant, a base, and water. The methods allow cultivating plants or explants in a plant tissue culture medium under non-aseptic conditions and thus obviate the need of the cumbersome and laborious procedures to sterilize the culture medium and the culture vessel in order to create aseptic conditions for plant or explant cultivation.

19 Claims, No Drawings

METHODS OF USING A COLLOIDAL SILVER-BASED COMPOSITION IN REDUCING OR PREVENTING MICROBIAL CONTAMINATION IN PLANTS OR EXPLANTS IN TISSUE CULTURE PROCESSES

CROSS REFERENCE TO RELATED APPLICATIONS

This application is the U.S. national phase of International Patent Application No. PCT/IB2021/050302, filed on Jan. 15, 2021, which claims priority under 35 U.S.C. § 119 (e) to U.S. Provisional Patent Application No. 62/964,807, filed Jan. 23, 2020. The foregoing applications are is incorporated by reference herein.

FIELD OF THE INVENTION

This disclosure relates generally to methods for reducing or preventing microbial contamination in plants or explants in a tissue culture process and more specifically to methods of using a colloidal silver-based composition in reducing or preventing microbial contamination in plants or explants in tissue culture processes, including micropropagation, cell culture, suspension cultures, callus culture, germplasm conservation and the like, under aseptic or non-aseptic conditions.

BACKGROUND OF THE INVENTION

Tissue culture is a technique for growing plant cells by incubating pieces of vegetal tissue (also known as explants) on a suitable nutrient medium. The technique allows in vitro cultivation of plant cells and organs, which can be divided and regenerated into calluses or new plant organs. The explants are taken from any part of the plant and are used as a starting point by introducing them into nutrient media to promote its growth.

During the tissue culture process, an aseptic environment is generally required to avoid contamination with microorganisms. The nutrient media used presents a combination of micro and macronutrients that are available as a source of nutrition for the explant. However, the same nutrients are also available for microorganisms that enter the system, either during the introduction process or attached to the explants. Plant cell division occurs at a much slower rate than that of bacteria and fungi, therefore the latter can easily overgrow the plant tissue inside the containers used for tissue culture. For this reason, all materials used (glassware, containers, instruments and the media itself) must be disinfected or sterilized to remove all living microbes by methods, such as autoclaving and the use of laminar flow hoods, in order to provide aseptic materials and conditions.

Generally, the sterilization of the culture medium and the culture vessel is performed with a high-pressure steam sterilizer (autoclave), while the inoculation of the plant tissue is performed in a sterile room on a clean bench fitted with a laminar flow hood. Accordingly, after the sterilization, the culture medium or the like must be removed from the autoclave and transferred to the sterile room. This task is cumbersome since it requires a great amount of care to avoid entry of microorganisms. Another problem is that the capacity of the autoclave or sterile room limits the amount of plant tissue that can be cultured, so that it is impossible to simultaneously culture a large amount of plant tissue.

Despite the existence of methods to provide aseptic conditions, the problem of microbial contamination is omnipresent. It poses a significant challenge for cultivating some explants and/or plant species due to the presence of endogenous microbes. Commercial tissue culture operations very often have to assume the loss of a percentage of their production due to microbial contamination.

Thus, there is a pressing need for methods and reagents for preventing and reducing the contamination levels in the different variations and stages of plant tissue culture.

SUMMARY OF THE INVENTION

This disclosure addresses the need mentioned above in a number of aspects. In one aspect, this disclosure provides a method for reducing or preventing microbial contamination in plants or explants in a tissue culture process. The method includes cultivating a plant or explant in a plant tissue culture medium formed from a colloidal silver-based composition. The silver-based composition comprises colloidal silver, a copolymer (e.g., methyl vinyl ether copolymer), a surfactant (e.g., polyoxyethylene octylphenyl ether), a base (e.g., sodium hydroxide, potassium hydroxide), and water.

In some embodiments, the method further comprises pre-treating the plant or explant with the composition. In some embodiments, the method comprises applying the composition to a surface of a plant or explant. In some embodiments, the composition is applied as a spray, a mist, or a dropper. In some embodiments, the method comprises inoculating the plant or explant in the plant tissue culture medium followed by applying the composition on top of the plant or explant, thereby forming a barrier (e.g., microfilm) that protects the plant or explant against microbial contamination.

In some embodiments, the composition comprises: 0.1-20% (w/v) colloidal silver, 1.75-4.38% (w/v) methylvinyl ether copolymer, 0.02-0.04% (w/v) polyoxyethylene octylphenyl ether, 0.02-0.04% (w/v) sodium hydroxide, and 89-95% (w/v) water. In some embodiments, the composition comprises: about 5.00% (w/v) colloidal silver, about 3.50% (w/v) methylvinyl ether copolymer, about 0.099% (w/v) polyoxyethylene octylphenyl ether, about 0.032% (w/v) sodium hydroxide, and about 91.36% (w/v) water.

In some embodiments, the water is distilled or deionized. In some embodiments, the base (e.g., sodium hydroxide, potassium hydroxide) is used to neutralize the composition.

In some embodiments, the colloidal silver has the following characteristics: (a) it is silver suspended in distilled water and produced by dispersion according to published guidelines (NIST, 2012) or by electrical methods of silver electrodes; (b) it has an atomic mass of 107,868 g/mol; (c) it has a melting point of 960.5° C.; (d) it has a boiling point of 2000° C.; (e) it has a density at 15° C. of 10.49 g/mL; (f) it is not attacked by water or atmospheric oxygen; (g) it is obscured by ozone and hydrogen sulfide; (h) it is inert to many acids and reacts easily with dilute nitric acid and hot sulfuric acid; and (i) it is not sensitive to light in their metallic form.

In some embodiments, particles of colloidal silver have an average particle size of between about 60 nm and about 140 nm. In some embodiments at least 50% of particles of colloidal silver have a particle size of between about 60 nm and about 140 nm. In some embodiments, at least 90% of particles of colloidal silver have a particle size of between about 60 nm and about 140 nm.

In some embodiments, the composition further comprises an acceptable carrier for the tissue culture process. In some embodiments, the composition further comprises at least one of a second fungicidal agent and a second bactericidal agent.

In some embodiments, the composition is provided in a concentrated form, in a powder form, or in a hydrogel form (or concentrated gel form).

In some embodiments, the composition is prepared by: (a) placing 89.2-95.7 Kg of water to a 100 L stainless steel vessel; (b) slowly adding 2.50-6.25 Kg the colloidal silver concentrate while stirring; (c) adding 50-120 grams of polyoxyethylene octyl phenyl ether; (d) adding 1.75-4.38 Kg of methyl vinyl ether copolymer, wherein the methyl vinyl ether copolymer was previously polymerized in a stainless steel vessel containing 1.75-4.38 L of deionized water at 40° C.; (e) adding 1 L of a 20-40 g/L sodium hydroxide solution; and (f) agitating continuously until the resultant mixture becomes transparent.

In some embodiments, the composition is prepared by: (a) placing 91.4 Kg of water to a 100 L stainless steel vessel; (b) slowly adding 5 Kg the colloidal silver concentrate while stirring; (c) adding 99 grams of polyoxyethylene octyl phenyl ether; (d) adding 3.5 Kg of methyl vinyl ether copolymer, wherein the methyl vinyl ether copolymer was previously polymerized in a stainless steel vessel containing 3.5 L of deionized water at 40° C.; (e) adding 1 L of a 35 g/L sodium hydroxide solution; and (f) and agitating continuously until the resultant mixture becomes transparent.

In some embodiments, the microbial contamination is caused by fungi or bacteria. In some embodiments, the fungi are selected from the group consisting of *Blumeria, Sphaerotheca, Phytophthora, Rhizoctonia, Fusarium, Penicillium, Aspergillus Colletotrichum, Botrytis, Magnaporthe, Pythium, Puccinia, Erysiphe, Alternaria, Pseudoperonospora, Plasmodiophora, Sclerotinia, Fulvia, Peronospora, Ustilago,* and *Rhizopus.* In some embodiments, the bacteria are selected from the group consisting of *Corynebacterium, Bacillus, Staphylococcus, Escherichia, Pseudomonas, Xanthomonas, Erwinia, Clavibacter, Ralstonia, Burkholderia,* and *Agrobacterium.*

The foregoing summary is not intended to define every aspect of the disclosure, and additional aspects are described in other sections, such as the following detailed description. The entire document is intended to be related as a unified disclosure, and it should be understood that all combinations of features described herein are contemplated, even if the combination of features are not found together in the same sentence, or paragraph, or section of this document. Other features and advantages of the invention will become apparent from the following detailed description. It should be understood, however, that the detailed description and the specific examples, while indicating specific embodiments of the disclosure, are given by way of illustration only, because various changes and modifications within the spirit and scope of the disclosure will become apparent to those skilled in the art from this detailed description.

DETAILED DESCRIPTION OF THE INVENTION

This disclosure provides a method for reducing or preventing microbial contamination in plants or explants in a tissue culture process. The method includes cultivating a plant or explant in a plant tissue culture medium formed from a colloidal silver-based composition. The silver-based composition comprises colloidal silver, a copolymer (e.g., methyl vinyl ether copolymer), a surfactant (e.g., polyoxyethylene octylphenyl ether), a pH adjusting agent (e.g., a base), and water.

The present methods permit cultivating plants or explants in a plant tissue culture medium under non-aseptic conditions. Thus, the methods obviate the need of the cumbersome and laborious procedures for sterilizing the culture medium and the culture vessel in order to create aseptic conditions for plant or explant cultivation.

The antimicrobial properties of silver have been widely recognized, and its efficacy as an antimicrobial has been demonstrated. To meet the need of the development of effective antimicrobial agents to respond to the omnipresent and undesired contamination caused by bacteria and fungi in the tissue culture processes, this disclosure provides a method based on a colloidal silver-based composition with the ability to prevent and control infections caused by microorganisms in the tissue culture processes, for example, by means of a contact action mode (e.g., non-systemic).

The composition comprises colloidal silver as an active/effective component, in which colloidal silver is mixed with polymers. When the composition is added to the nutrient media of tissue culture, or applied directly on the explants, or used as part of the disinfection process of explants prior to their introduction to nutrient media, or in any part of the tissue culture process, either by being present in the nutrient media or by forming a microfilm on the surface of the explant or by aiding in the disinfection process of explants. It prevents the development of contamination caused by fungi and bacteria, without any side effect on the explant and its development. Due to the nature of the composition and the non-systemic application, it is non-toxic to host explants and plants, and humans, and it does not pollute ecosystems. The composition may be used as part of the disinfection process of explants prior to their introduction. The composition may be used to introduce and/or multiply plant tissue in non-aseptic conditions. The composition comprises a preparation containing colloidal silver that functions as a fungicide and bactericide to prevent and control many of the contamination caused by fungi and bacteria in the tissue culture processes.

The mechanisms involved in the antimicrobial activity of colloidal silver may include: (1) changing and damaging the membrane structure of a microorganism, which increases its permeability and disrupts the transportation functions, resulting in cell death, (2) penetration of a microorganism and interaction with phosphorus and sulfur-containing compounds, such as DNA and proteins, (3) loss of the replication ability of the DNA, (4) inactivation of certain enzymes, (5) attacking the respiratory chain, and (6) generating hydrogen peroxide and free radicals. The antimicrobial activity exerted by the composition is multifold, employing the principles of microfilm technology and surface chemistry: (1) when applied on the explants, the composition forms microfilm which serves as an effective physical barrier to microorganisms (e.g., bacteria, fungi). The composition is an aqueous suspension of colloidal silver in a matrix of methylvinyl ether copolymer that has a protective effect, in which the colloidal silver associated with the copolymer of methyl vinyl ether generate effective protective microfilm. The microfilm is generated by the polymer and after the microfilm is formed, the embedded colloidal silver can come into direct contact with the microorganisms (e.g., bacteria, fungi) on the surface of the explant; (3) when applied near fungi and bacteria on the surface of explants or the nutrient media or the solutions used to disinfect explants, the composition neutralizes the enzymes that microorganisms use to metabolize oxygen, and (4) at the same time, it alters the permeability of the membrane of the unicellular organism, inducing effective asphyxiation of the microorganism One of the advantages of the disclosed composition is that the methyl vinyl ether copolymer used in the formulation creates an invisible mesh that holds the components together, without interfering with the normal functioning of the explant tissue and allowing cell regeneration and multiplication.

In some embodiments, the method may include obtaining the explant, which may come from another in vitro cultured plant, a living plant, a fragment of a living plant, a seed, or another form of vegetal tissue, which can be selected from a maintained stock of plants for culture initiation.

The vegetal tissue may be disinfected using substances that help eliminate microbial contamination already present on or in the explant. This process is often initiated with scrubs using soap and water, followed by treatments with disinfectants. In some embodiments, the composition can be used in a disinfectant in addition to or in replacement of commonly used disinfectants. The disinfected explants may be subject to preparation for inoculation in the culture media. This preparation consists of dissection of the explant to expose the suitable tissue and removal of undesired tissue. The preparation process may be performed in a sterile environment, such as in a laminar flow hood. However, when the composition of the present invention is used, this process may be performed without using a laminar flow hood. In some embodiments, the method may further include inoculating the processed vegetal explant into the culture media using sterile containers. This step may be performed in a sterile environment, such as in a laminar flow hood. However, when the composition of the present invention is used, this process may be performed without using a laminar flow hood. The containers with the vegetal explant inside may be transferred to an environment with suitable growing conditions, such as incubation rooms that provide the appropriate temperature and light conditions. Additionally and/or optionally, after the explant has been inoculated in the culture media, a liquid solution of the composition described herein can be added on top of the explant, thereby forming a barrier (e.g., microfilm) that will protect the explant against microbial contamination.

In some embodiments, the method comprises pre-treating the plant or explant with the composition. Surface sterilization of plant materials prior to the introduction to sterile culture media is a crucial step in establishing a plant tissue culture protocol. The heavy microbial contamination present in plants and explants makes in vitro culture establishment problematic. This contamination is usually overcome through effective surface sterilization of the plant material among other aseptic techniques. Explants are treated for surface sterilization through a process that involves the immersion of explants into an appropriate concentration of chemical sterilant(s) or disinfectant(s) for a specified period of time. This treatment results in the establishment of a culture with little contamination or a reduced contamination level. Various types of disinfectants can be used, including but not limited to ethanol, isopropyl alcohol, hypochlorite-sodium (NaOCl)/calcium ($Ca(ClO)_2$), hydrogen peroxide ($H_2O_2$), mercuric chloride ($HgCl_2$), silver nitrate ($AgNO_3$), and bromine water. The type, concentration, and time of exposure of the disinfectant(s) required differ for different plant species and plant parts. Ethanol is a very powerful sterilizing agent but is also phytotoxic, causing damage to the explant and reducing the prospects of a successful introduction. It generally requires follow-up treatment with other disinfectant(s). Hypochlorite and related chemical compounds are also very effective in significantly reducing the microbial population in the explant, even at micromolar concentrations, although it is also aggressive towards the plant tissue.

An effective surface pretreatment of the plant tissue to be introduced into the culture media significantly increases the probability of success. Reducing the microbial burden in the explant will reduce the emergence of microbial contamination in the next steps of the process.

In some embodiments, the method comprises applying the composition to a surface of a plant or explant. In some embodiments, the composition is applied as a spray, a mist, or a dropper.

In some embodiments, the composition comprises: 0.1-20% (w/v) colloidal silver, 1.75-4.38% (w/v) methylvinyl ether copolymer, 0.02-0.04% (w/v) polyoxyethylene octylphenyl ether, 0.02-0.04% (w/v) sodium hydroxide, and 89-95% (w/v) water. In some embodiments, the composition comprises: about 5.00% (w/v) colloidal silver, about 3.50% (w/v) methylvinyl ether copolymer, about 0.099% (w/v) polyoxyethylene octylphenyl ether, about 0.032% (w/v) sodium hydroxide, and about 91.36% (w/v) water.

In some embodiments, the water is distilled or deionized. The colloidal silver contained in the composition has high preservability and thus can be used in the state of being diluted in tap water or distilled water. As a result, the composition can be more easily handled and has reduced costs.

In some embodiments, the copolymer can be any one of methyl vinyl ether/maleic anhydride, poly(methyl methacrylate) (PMMA), Polyether-Silicone, Iso-Dimethicone, methylene diphenyl diisocyanate, Phenylenediamine, polyvinyl acetate, ethylene-vinyl acetate (EVA), polyvinyl alcohol, polyvinylpyrrolidone, vinyl chloride, vinylidene chloride copolymers, calcium lignosulfonates, acrylic copolymers, polyvinylacrylates, polyethylene oxide, acylamide, polyhydroxyethyl acrylate, and the like.

In some embodiments, the surfactant can be any one of Polyoxyethylene glycol octylphenol ethers, Polyoxyethylene glycol alkylphenol ethers, Polysorbates, Sorbitan alkyl esters, polyethylene glycol, polypropylene glycol, Prefer 28 (CENEX), SurfN(US), Inhance (BRANDT), P-28 (WIL-FARM) and Patrol (HELENA); esterified seed oils include Sunit II (AMCY), MSO (UAP), Scoil (AGSCO), Hasten (WILFARM) and Mes-100 (DREXEL); organo-silicone surfactants include Silwet L77 (UAP), Silikin (TERRA), Dyne-Amic (HELENA), Kinetic (HELENA), Sylgard 309 (WIL-BUR-ELLIS), Century (PRECISION), and the like.

In some embodiments, a pH adjusting agent, such as sodium hydroxide, can be used to neutralize the composition. It will be appreciated that other bases (e.g., strong bases or weak bases) may be used to neutralize the composition, including without limitation, lithium hydroxide, potassium hydroxide, cesium hydroxide, calcium hydroxide, zinc hydroxide, and ammonium hydroxide.

In some embodiments, the colloidal silver has the following characteristics: (a) it is silver suspended in distilled water and produced by dispersion according to published guidelines (NIST, 2012) or by electrical methods of silver electrodes; (b) it has an atomic mass of 107,868 g/mol; (c) it has a melting point of 960.5° C.; (d) it has a boiling point of 2000° C.; (e) it has a density at 15° C. of 10.49 g/mL; (f) it is not attacked by water or atmospheric oxygen; (g) it is obscured by ozone and hydrogen sulfide; (h) it is inert to many acids and reacts easily with dilute nitric acid and hot sulfuric acid; and (i) it is not sensitive to light in their metallic form.

In some embodiments, the composition is provided in a concentrated form (e.g., stock solution), in a powder form, or in a hydrogel form (or concentrated gel form), which can be further formulated, for example, by dilution in a liquid, into a plant tissue culture medium. The liquid can be water, such as distilled or deionized water.

In some embodiments, the composition used in the above-disclosed methods can be prepared by a multi-step process. The process begins with the preparation of the colloidal silver concentrate. 100 liters of distilled or deionized water is poured into a stainless steel container, and a polyethylene hose connected to a water pump is inserted. The water pump drives the water to the generator of the colloidal silver, which is connected to a source of voltage of 110 V. The generator is composed of a pump to control the amount of water that enters the electrodes and another to regulate the amount of water that leaves the system. The second water pump, connected to a 110 V outlet, recirculates for one minute the water containing the colloidal silver in the system, to increase the concentration of silver and thus ensure that the final product contains the required silver concentration. The controlled size of colloidal silver is obtained by filtration. A solution is then prepared by placing 89.2-95.7 Kg of water to a 100 L stainless steel vessel and slowly adding 2.50-6.25 Kg the colloidal silver concentrate while stirring; then adding 50-120 grams of polyoxyethylene octyl phenyl ether and 1.75-4.38 Kg of methyl vinyl ether copolymer, wherein the methyl vinyl ether copolymer was previously polymerized in a stainless steel vessel containing 1.75-4.38 L of deionized water at 40° C., then adding 1 L of a 20-40 g/L sodium hydroxide solution and agitating continuously until the resultant mixture becomes transparent. In some embodiments, the composition is prepared by: (a) placing 91.4 Kg of water to a 100 L stainless steel vessel; (b) slowly adding 5 Kg the colloidal silver concentrate while stirring; (c) adding 99 grams of polyoxyethylene octyl phenyl ether; (d) adding 3.5 Kg of methyl vinyl ether copolymer, wherein the methyl vinyl ether copolymer was previously polymerized in a stainless steel vessel containing 3.5 L of deionized water at 40° C.; (e) adding 1 L of a 35 g/L sodium hydroxide solution; and (f) and agitating continuously until the resultant mixture becomes transparent.

The process for preparing the composition may utilize a generator, such as a Robey device. The generator uses a 110 V voltage source, a current controller, two silver electrodes, and a cellulose filter. The cellulose filter restricts the passage of silver colloids of an average particle size of less than about 60 nm and greater than about 600 nm.

In some embodiments, particles of colloidal silver have an average particle size of between about 60 nm and about 600 nm. In some embodiments, at least 10% (e.g., at least 20%, at least 30%, at least 40%, at least 50%, at least 60%, at least 70%, at least 80%, at least 90%, 100%) of particles of colloidal silver have a particle size of between about 60 nm and about 600 nm. In some embodiments, at least 90% of particles of colloidal silver have a particle size of between about 60 nm and about 600 nm. In some embodiments, at least 10% (e.g., at least 20%, at least 30%, at least 40%, at least 50%, at least 60%, at least 70%, at least 80%, at least 90%, 100%) of particles of colloidal silver in the composition exist as nanoparticles having a particle size of between about 60 nm and about 100 nm.

In some embodiments, particles of colloidal silver have an average particle size of between about 60 nm and about 140 nm. In some embodiments at least 50% of particles of colloidal silver have a particle size of between about 60 nm and about 140 nm. In some embodiments, at least 90% of particles of colloidal silver have a particle size of between about 60 nm and about 140 nm.

In some embodiments, the particles of colloidal silver may have a largest dimension (e.g., diameter) of between about 60 nm and about 600 nm (e.g., between about 60 nm and about 500 nm, between about 60 nm and about 400 nm, between about 60 nm and about 300 nm, between about 60 nm and about 200 nm, between about 60 nm and about 140 nm, between about 60 nm and about 100 nm).

The particles of colloidal silver can have a variety of different shapes including spheres, oblate spheroids, cylinders, ovals, ellipses, shells, cubes, cuboids, cones, pyramids, rods (e.g., cylinders or elongated structures having a square or rectangular cross-section), tetrapods (particles having four leg-like appendages), triangles, prisms, etc.

In some embodiments, one or more substantially uniform populations of the particles of colloidal silver are used, e.g., 2, 3, 4, 5, or more substantially uniform populations having distinguishable properties (e.g., size, optical property). It will be appreciated that a combination of two or more populations having distinguishable properties can be considered to be a single population.

As used herein, "tissue culture process," "tissue culturing process," or "culturing plant tissue" refers to any process to germinate seeds or otherwise propagate or differentiate plants, plant organs, plant tissues, or plant cells. In some embodiments, plant tissue cultures in a culture medium (e.g., a solid medium or a liquid medium) can be further sub-cultured. The plant tissue cultures can be maintained in a defined or undefined medium, which typically under sterile (aseptic) conditions. However, the methods disclosed above advantageously allow tissue culture to be maintained under non-aseptic conditions.

The plant tissue culture medium may include an appropriate mixture of phytohormones or mineral salts of appropriate concentrations. Examples of phytohormones may include auxins, cytokinins or gibberellins, vitamins, such as one or more B vitamins, one or more carbon sources including, for example, sucrose or glucose, and one or more undefined growth enhancers, such as coconut milk The components of the mineral salts mixture may be selected in accordance with the particular plant species being propagated and prepared needs. The appropriate composition of the mineral salts may be determined empirically or selected from the mineral salts previously known in the plant tissue culture art. Alternatively, the mineral salts can be selected from commercially available mixtures (e.g., from Sigma Chemical Co., St. Louis, Mo., USA). In addition, other macronutrients and vitamin components can be combined in various ways for producing a medium that is suitable for the propagated plant variety.

According to the methods disclosed herein, the colloidal silver-based composition is added in the plant tissue culture medium at a concentration, which reduces or prevents the growth of bacteria or fungi, or both, and which allows normal germination of seeds or propagation of the plant, plant organ, plant tissue, or plant farmed on seeds and promotes normal cell growth and development (e.g., substantially normal germination of seeds).

In some embodiments, plant tissue culture media can be prepared by combining its ingredients according to the established protocols for the plant species being used. Media should generally contain one or more of the following components: macronutrients (such as N, P, K, S, Mg and Ca), micronutrients (such as Cu, Fe, Zn, Mn, B, and Mo), vitamins, amino acids or nitrogen supplements, source(s) of carbon, organic supplements, growth regulators and solidifying agents.

There are several basic media of a known composition that are frequently used. These include Murashige and Skoog (MS) medium, Linsmaier and Skoog (LS) medium, Gamborg (B5) medium, and Nitsch and Nitsch (NN) medium. The culture media used for a specific process can be one of these basic media recipes, with specific additions of one or more of the following ingredients: macronutrients (such as N, P, K, S, Mg and Ca), micronutrients (such as Cu, Fe, Zn, Mn, B, and Mo), vitamins, amino acids or nitrogen supplements, source(s) of carbon, organic supplements, growth regulators and solidifying agents.

The amount (or the final concentration) of the composition described herein to be used in the culture media, disinfection solution, or other application may vary in each use case. For example, it may depend on the plant species used (some are more prone to contamination), the source of the explant (some are dirtier than others), the technique used, amongst other variables.

In some embodiments, a culture medium may contain between about 0.01% (w/v) and about 25% (w/v) of the composition. Similarly, the composition may be used at a concentration of between about 0.01% (w/v) and about 25% (w/v) when applied using a dropper, used as a disinfection solution or in other applications.

In some embodiments, the methods of using the colloidal silver-based composition in a plant tissue culturing process reduce the rate of bacterial or fungal contamination in at least 20% (e.g., at least 30%, at least 40%, at least 50%, at least 60%, at least 70%, at least 80%, at least 90%, at least 100%, at least 150%, at least 200%, at least 300%, at least 400%, at least 500%) compared to control media lacking the composition.

As used herein, substantially normal germination of seeds is defined as a germination percentage that is at least 50% of a control not containing the composition in the medium.

In some embodiments, the methods of using the colloidal silver-based composition in a plant tissue culturing process achieve an increased growth rate or an increased cell division rate of plant cells plants, plant organs, or plant tissues, which is at least 20% (e.g., at least 30%, at least 40%, at least 50%, at least 60%, at least 70%, at least 80%, at least 90%, at least 100%, at least 150%, at least 200%, at least 300%, at least 400%, at least 500%) greater than the corresponding control not containing the composition.

In some embodiments, the effectiveness of the present methods can be studied using morphological, anatomical, physiological and biochemical assays known in the art. For example, a morphological analysis may comprise comparing the roots, shoots, leaves or reproductive organs, or parts of the shape, size or number. An anatomical analysis may comprise, for example, the size, shape, pattern or differentiation of cells of the comparative analysis, such as vascular tissues, trichomes, or stomata amount, location or maturation, or presence or absence of actively dividing meristems. A physiological analysis may, for example, apply comparative analysis of respiration, photosynthesis, stomatal resistance or ethylene production speed. A biochemical analysis may comprise, for example, protein or DNA synthesis, chlorophyll degradation or the comparative analysis, or other pigments presence, absence, or amount of the comparative analysis. These analyses can also be used to determine or select the optimal concentration of the composition a tissue culture medium and thus to put the present methods into practice for a particular plant species.

In some embodiments, the microbial contamination can be caused by any unwanted microorganisms, such as fungi or bacteria.

The fungus can be one of fungi responsible for contamination in the tissue culture processes, including without limitation, *Blumeria, Sphaerotheca, Phytophthora, Rhizoctonia, Fusarium, Penicillium, Aspergillus, Colletotrichum, Botrytis, Magnaporthe, Pythium, Puccinia, Erysiphe, Alternaria, Pseudoperonospora, Plasmodiophora, Sclerotinia, Fulvia, Peronospora, Ustilago,* and *Rhizopus.* The composition inhibits the growth and development of both Gram-positive bacteria and Gram-negative bacteria.

In some embodiments, examples of bacteria include, without limitation, Corynebacterium, Bacillus, Staphylococcus, Escherichia, Pseudomonas, Xanthomonas, Erwinia, Clavibacter, Ralstonia, Burkholderia, and Agrobacterium. In some embodiments, the composition further comprises a carrier compatible or acceptable for the tissue culture processes. The compatible or acceptable carrier can be a nutrient or a surfactant. Also within the scope of this disclosure is a tissue culture nutrient media, formulated from the composition as described, for controlling contaminating microorganisms. In embodiments, the nutrient media may further include an acceptable carrier for the tissue culture processes. Also within the scope of this disclosure is a disinfection solution, formulated from the composition as described, for controlling contaminating microorganisms in the explant prior to its introduction to nutrient media.

"Acceptable carrier for the tissue culture processes" or "carrier compatible or acceptable for the tissue culture processes" refers to any material, other than water, which can be added to a composition without causing or having an adverse effect on the plant, explant, or the like. In some embodiments, the carrier can be a solid carrier or liquid carrier, and in various forms including microspheres, powders, emulsions, and the like. The carrier may be any one or more of a number of carriers that confer a variety of properties, such as increased stability, wettability, or dispersibility. In some embodiments, the carrier may include glycerol, cellulose, PEG, natural substances or extracts (such as protein hydrolysates, coconut milk, yeast extract, malt extract), activated charcoal, solidifying agents such as agar, agarose, and gellan gum.

In some embodiments, examples of the carrier may include, without limitation, alginate, gums, starches, lecithins, formononetin, polyvinyl alcohol, alkali formononetinate, hesperetin, polyvinyl acetate, cephalins, Gum Arabic, Xanthan Gum, Mineral Oil, Polyethylene Glycol (PEG), Polyvinyl pyrrolidone (PVP), 1-Arabinogalactan, Methyl Cellulose, PEG 400, Chitosan, Polyacrylamide, Polyacrylate, Polyacrylonitrile, Glycerol, Triethylene glycol, Vinyl Acetate, Gellan Gum, Polystyrene, Polyvinyl, Carboxymethyl cellulose, Gum Ghatti, and polyoxyethylene-polyoxybutylene block copolymers. The carrier can be non-naturally occurring compounds, e.g., polymers and copolymers. For example, non-limiting examples of polymers that can be used as an adhesive agent include: polyvinyl acetates, polyvinyl acetate copolymers, ethylene-vinyl acetate (EVA) copolymers, polyvinyl alcohols, polyvinyl alcohol copolymers, celluloses (e.g., ethylcelluloses, methylcelluloses, hydroxymethylcelluloses, hydroxypropylcelluloses, and carboxymethylcelluloses), polyvinylpyrrolidone, vinyl chloride, vinylidene chloride copolymers, calcium lignosulfonates, acrylic copolymers, polyvinylacrylates, polyethylene oxide, acylamide polymers and copolymers, polyhydroxyethyl acrylate, methylacrylamide monomers, and polychloroprene. In some embodiments, the composition may also contain a surfactant. Non-limiting examples of surfactants include nitrogen-surfactant blends such as Prefer 28 (CENEX), SurfN(US), Inhance (BRANDT), P-28 (WIL-FARM) and Patrol (HELENA); esterified seed oils include Sunit II (AMCY), MSO (UAP), Scoil (AGSCO), Hasten (WILFARM) and Mes-100 (DREXEL); and organo-silicone surfactants include Silwet L77 (UAP), Silikin (TERRA), Dyne-Amic (HELENA), Kinetic (HELENA), Sylgard 309 (WILBUR-ELLIS) and Century (PRECISION). In some embodiments, the surfactant is present at a concentration of between 0.001% v/v to 10% v/v (e.g., between 0.001% v/v to 1% v/v). In some embodiments, the composition may include a stabilizer. Such an agent can include one or more of trehalose, sucrose, glycerol, and methylene glycol. Other suitable stabilizers include, but are not limited to, non reducing sugars and sugar alcohols (e.g., mannitol or sorbitol).

In some embodiments, the composition further comprises a second fungicidal agent and/or a second bactericidal agent. In some embodiments, it can be advantageous for the composition to include agents such as a fungicide, an antibacterial agent, or a nutrient. The agent is ideally one which does not cause safety concerns for human, animal or industrial use (e.g., no safety issues or the compound is sufficiently labile that the commodity plant product derived from the tissue culture processes contains negligible amounts of the compound). As used herein, a "fungicide" includes a commercially available synthetic chemical compound that is designed to protect plants and explants from pathogenic fungi. Examples of the fungicide may include, without limitation, 2-(thiocyanatomethylthio)-benzothiazole, 2-phenylphenol, 8-hydroxyquinoline sulfate, ametoctradin, amisulbrom, antimycin, Ampelomyces quisqualis, azaconazole, azoxystrobin, Bacillus subtilis, benalaxyl, benomyl, benthiavalicarbisopropyl, benzylaminobenzenesulfonate (BABS) salt, bicarbonates, biphenyl, bismerthiazol, bitertanol, bixafen, blasticidinS, borax, Bordeaux mixture, boscalid, bromuconazole, bupirimate, calcium polysulfide, captafol, captan, carbendazim, carboxin, carpropamid, carvone, chloroneb, chlorothalonil, chlozolinate, Coniothyrium minitans, copper hydroxide, copper octanoate, copper oxychloride, copper sulfate, copper sulfate (tribasic), cuprous oxide, cyazofamid, cyflufenamid, cymoxanil, cyproconazole, cyprodinil, dazomet, debacarb, diammonium ethylenebis-(dithiocarbamate), dichlofluanid, dichlorophen, diclocymet, diclomezine, dichloran, diethofencarb, difenoconazole, difenzoquat ion, diflumetorim, dimethomorph, dimoxystrobin, diniconazole, diniconazole-M, dinobuton, dinocap, diphenylamine, dithianon, dodemorph, dodemorph acetate, dodine, dodine free base, edifenphos, enestrobin, epoxiconazole, ethaboxam, ethoxyquin, etridiazole, famoxadone, fenamidone, fenarimol, fenbuconazole, fenfuram, fenhexamid, fenoxanil, fenpiclonil, fenpropidin, fenpropimorph, fentin, fentin acetate, fentin hydroxide, ferbam, ferimzone, fluazinam, fludioxonil, flumorph, fluopicolide, fluopyram, fluoroimide, fluoxastrobin, fluquinconazole, flusilazole, flusulfamide, flutianil, flutolanil, flutriafol, fluxapyroxad, folpet, formaldehyde, fosetyl, fosetyl-aluminium, fuberidazole, furalaxyl, furametpyr, guazatine, guazatine acetates, GY-81, hexachlorobenzene, hexaconazole, hymexazol, imazalil, imazalil sulfate, imibenconazole, iminoctadine, iminoctadine triacetate, iminoctadine tris(albesilate), ipconazole, iprobenfos, iprodione, iprovalicarb, isoprothiolane, isopyrazam, isotianil, kasugamycin, kasugamycin hydrochloride hydrate, kresoxim-methyl, mancopper, mancozeb, mandipropamid, maneb, mepanipyrim, mepronil, mercuric chloride, mercuric oxide, mercurous chloride, metalaxyl, mefenoxam, metalaxyl-M, metam, metam-ammonium, metam-potassium, metam-sodium, metconazole, methasulfocarb, methyl iodide, methyl isothiocyanate, metiram, metominostrobin, metrafenone, mildiomycin, myclobutanil, nabam, nitrothal-isopropyl, nuarimol, octhilinone, ofurace, oleic acid (fatty acids), orysastrobin, oxadixyl, oxine-copper, oxpoconazole fumarate, oxycarboxin, pefurazoate, penconazole, pencycuron, penflufen, pentachlorophenol, pentachlorophenyl laurate, penthiopyrad, phenylmercury acetate, phosphonic acid, phthalide, picoxystrobin, polyoxin B, polyoxins, polyoxorim, potassium bicarbonate, potassium hydroxyquinoline sulfate, probenazole, prochloraz, procymidone, propamocarb, propamocarb hydrochloride, propiconazole, propineb, proquinazid, prothioconazole, pyraclostrobin, pyrametostrobin, pyraoxystrobin, pyrazophos, pyribencarb, pyributicarb, pyrifenox, pyrimethanil, pyroquilon, quinoclamine, quinoxyfen, quintozene, Reynoutria sachalinensis extract, sedaxane, silthiofam, simeconazole, sodium 2-phenylphenoxide, sodium bicarbonate, sodium pentachlorophenoxide, spiroxamine, sulfur, SYP-Z071, SYP-Z048, tar oils, tebuconazole, tebufloquin, tecnazene, tetraconazole, thiabendazole, thifluzamide, thiophanate -methyl, thiram, tiadinil, tolclofosmethyl, tolylfluanid, triadimefon, triadimenol, triazoxide, tricyclazole, tridemorph, trifloxystrobin, triflumizole, triforine, triticonazole, validamycin, valifenalate, valiphenal, vinclozolin, zineb, ziram, zoxamide, Candida oleophila, Fusarium oxysporum, Gliocladium spp., Phlebiopsis gigantea, Streptomyces griseoviridis, Trichoderma spp., (RS)-N-(3, 5-dichlorophenyl)-2-(methoxymethyl)-succinimide, 1,2-dichloropropane, 1,3-dichloro-1,1,3,3-tetrafluoroacetone hydrate, 1-chloro-2,4-dinitronaphthalene, 1-chloro-2-nitropropane, 2-(2-heptadecyl-2-imidazolin- 1 -yl)ethanol, 2,3-dihydro-5-phenyl-1,4-dithi-ine 1,1,4,4-tetraoxide, 2-methoxyethylmercury acetate, 2-methoxyethylmercury chloride, 2methoxyethylmercury silicate, 3-(4-chlorophenyl)-5 -methylrhodanine, 4-(2-nitroprop-1 enyl) phenyl thiocyanateme, ampropylfos, anilazine, azithiram, barium polysulfide, Bayer 32394, benodanil, benquinox, bentaluron, benzamacril; benzamacril-isobutyl, benzamorf, binapacryl, bis(methylmercury) sulfate, bis(tributyltin) oxide, buthiobate, cadmium calcium copper zinc chromate sulfate, carbamorph, CECA, chlobenthiazone, chloraniformethan, chlorfenazole, chlorquinox, climbazole, cyclafuramid, cypendazole, cyprofuram, decafentin, dichlone, dichlozoline, diclobutrazol, dimethirimol, dinocton, dinosulfon, dinoterbon, dipyrithione, ditalimfos, dodicin, drazoxolon, EBP, ESBP, etaconazole, etem, ethirim, fenaminosulf, fenapanil, fenitropan, 5-fluorocytosine and pro fungicides thereof, fluotrimazole, furcarbanil, furconazole, furconazole-cis, furmecyclox, furophanate, glyodine, griseofulvin, halacrinate, Hercules 3944, hexylthiofos, ICIA0858, isopamphos, isovaledione, mebenil, mecarbinzid, metazoxolon, methfuroxam, methylmercury dicyandiamide, metsulfovax, milneb, mucochloric anhydride, myclozolin, N-3,5- dichlorophenyl-succinimide, N-3-nitrophenylitaconimide, natamycin, N-ethylmercurio-4-toluenesulfonanilide, nickel bis(dimethyldithiocarbamate), OCH, phenylmercury dimethyldithiocarbamate, phenylmercury nitrate, phosdiphen, picolinamide UK-2A and derivatives thereof, prothiocarb; prothiocarb hydrochloride, pyracarbolid, pyridinitril, pyroxychlor, pyroxyfur, quinacetol; quinacetol sulfate, quinazamid, quinconazole, rabenzazole, salicylanilide, SSF-109, sultropen, tecoram, thiadifluor, thicyofen, thiochlorfenphim, thiophanate, thioquinox, tioxymid, triamiphos, triarimol, triazbutil, trichlamide, urbacid, XRD-563, and zarilamide, IK-1140. Examples of the bactericidal agent may include, without limitation, Amikacin, Gentamicin, Kanamycin, Neomycin, Netilmicin, Tobramycin, Paromomycin, Spectinomycin, Geldanamycin, Herbimycin, Rifaximin, streptomycin, Loracarbef, Ertapenem, Doripenem, Imipenem/Cilastatin, Meropenem, Cefadroxil, Cefazolin, Cefalotin or Cefalothin, Cefalexin, Cefaclor, Cefamandole, Cefoxitin, Cefprozil, Cefuroxime, Cefixime, Cefdinir, Cefditoren, Cefoperazone, Cefotaxime, Cefpodoxime, Ceftazidime, Ceftibuten, Ceftizoxime, Ceftriaxone, 1 Cefepime, Ceftaroline fosamil, Ceftobiprole, Teicoplanin, Vancomycin, Telavancin, Clindamycin, Lincomycin, Daptomycin, Azithromycin, Clarithromycin, Dirithromycin, Erythromycin, Roxithromycin, Troleandomycin, Telithromycin, Spiramycin, Aztreonam, Furazolidone, Nitrofurantoin, Linezolid, Posizolid, Radezolid, Torezolid, Amoxicillin, Ampicillin, Azlocillin, Carbenicillin, Cloxacillin, Dicloxacillin, Flucloxacillin, Mezlocillin, 2 Methicillin, Nafcillin, Oxacillin, Penicillin G, Penicillin V, Piperacillin, Penicillin G, Temocillin, Ticarcillin, Amoxicillin/clavulanate, Ampicillin/sulbactam, Piperacillin/tazobactam, Ticarcillin/clavulanate, Bacitracin, Colistin, Polymyxin B, Ciprofloxacin, Enoxacin, Gatifloxacin, Levofloxacin, Lomefloxacin, Moxifloxacin, Nalidixic acid, Norfloxacin, Ofloxacin, Trovafloxacin, Grepafloxacin, Sparfloxacin, Temafloxacin, 2 Mafenide, Sulfacetamide, Sulfadiazine, Silver sulfadiazine, Sulfadimethoxine, Sulfamethizole, Sulfamethoxazole, Sulfanilimide (archaic), Sulfasalazine, Sulfisoxazole, TrimethoprimSulfamethoxazole (Co-trimoxazole) (TMP-SMX), Sulfonamidochrysoidine (archaic), Demeclocycline, Doxycycline, Minocycline, Oxytetracycline, Tetracycline, Clofazimine, Dapsone, Capreomycin, Cycloserine, Ethambutol, Ethionamide, Isoniazid, Pyrazinamide, 3 Rifampicin (Rifampin in US), Rifabutin, Rifapentine, Streptomycin, Arsphenamine, Chloramphenicol, Fosfomycin, Fusidic acid, Metronidazole, Mupirocin, Platensimycin, Quinupristin/Dalfopristin, Thiamphenicol, Tigecycline, Tinidazole, and Trimethoprim.

In some embodiments, the method may include applying the composition to the surface of a plant or explant (e.g., leaf, fruit, flower, stem, root, meristems, calluses, shoots, embryos, seed). The method may selectively control fungi and/or bacteria in plants at a very low concentration. In addition, when the composition is applied once, preventive effects may continue for 1-3 weeks or longer. The composition can control both spores and hyphae, and has no chemical injury even if it is applied at a high concentration, and also, is harmless to the human body and to plants.

In some embodiments, the method may include applying into the nutrient media of the tissue culture processes. In some embodiments, the method may include applying the composition as a spray, a mist, or a dropper. The composition may be mixed with an acceptable carrier or diluent and thus be formulated into various formulations including nutrient media or additives to the tissue culture processes. In addition, the composition may be mixed with an additionally used component or surfactant or other known agents that control microbial contamination. The term "diluent" means an acceptable liquid or solid which is added to the composition so that it can be readily used or diluted at a desired active concentration. Examples of the diluent include talc, kaolin, zeolite, xylene, diatom, water, etc.

The formulation for use in a spray type, such as a water-dispersed concentrate or wet powder, may further include a wetting agent, a dispersant, a surfactant, etc. In addition to the diluent and the surfactant, a stabilizer, an inactivating agent, an adhesion improver, a colorant, a solidifying agent, an infiltrating agent, and a defoamer may be additionally included. The disclosed composition may be formulated into various forms. For example, the wet powder form prepared along with kaolin or diatoms can be diluted with water before being used as a spraying liquid, and thus, may be sprayed onto explants. Further, the composition may be mixed with an emulsifier to obtain a concentrate, which is then diluted with water before being applied to explants.

Definitions

To aid in understanding the detailed description of the compositions and methods according to the disclosure, a few express definitions are provided to facilitate an unambiguous disclosure of the various aspects of the disclosure. Unless otherwise defined, all technical and scientific terms used herein have the same meaning as commonly understood by one of ordinary skill in the art to which this disclosure belongs.

The terms "prevent," "preventing," "prevention," "prophylactic treatment" and the like refer to reducing the probability of developing a disorder or condition in a subject (e.g., plant), who does not have, but is at risk of or susceptible to developing a disorder or condition.

The terms "decrease," "reduced," "reduction," "decrease," or "inhibit" are all used herein generally to mean a decrease by a statistically significant amount. However, for avoidance of doubt, "reduced," "reduction" or "decrease" or "inhibit" means a decrease by at least 10% as compared to a reference level, for example, a decrease by at least about 20%, or at least about 30%, or at least about 40%, or at least about 50%, or at least about 60%, or at least about 70%, or at least about 80%, or at least about 90% or up to and including a 100% decrease (e.g., absent level as compared to a reference sample), or any decrease between 10-100% as compared to a reference level.

The term "treating" or "treatment" refers to administration of a compound or agent to a subject (e.g., plant) who has a disorder or is at risk of developing the disorder with the purpose to cure, alleviate, relieve, remedy, delay the onset of, prevent, or ameliorate the disorder, the symptom of the disorder, the disease state secondary to the disorder, or the predisposition toward the disorder.

The word "substantially" does not exclude "completely," e.g., a composition which is "substantially free" from Y may be completely free from Y. Where necessary, the word "substantially" may be omitted from the definition of the invention. As used herein, the term "approximately" or "about," as applied to one or more values of interest, refers to a value that is similar to a stated reference value. In some embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value). Unless indicated otherwise herein, the term "about" is intended to include values, e.g., weight percents, proximate to the recited range that are equivalent in terms of the functionality of the individual ingredient, the composition, or the embodiment.

As disclosed herein, a number of ranges of values are provided. It is understood that each intervening value, to the tenth of the unit of the lower limit, unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included in the invention.

It is noted here that, as used in this specification and the appended claims, the singular forms "a," "an," and "the" include plural reference unless the context clearly dictates otherwise. The terms "including," "comprising," "containing," or "having" and variations thereof are meant to encompass the items listed thereafter and equivalents thereof as well as additional subject matter unless otherwise noted.

The phrases "in one embodiment," "in various embodiments," "in some embodiments," and the like are used repeatedly. Such phrases do not necessarily refer to the same embodiment, but they may unless the context dictates otherwise.

The terms "and/or" or "/" means any one of the items, any combination of the items, or all of the items with which this term is associated.

As used herein, the term "each," when used in reference to a collection of items, is intended to identify an individual item in the collection but does not necessarily refer to every item in the collection. Exceptions can occur if explicit disclosure or context clearly dictates otherwise.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. All methods described herein are performed in any suitable order unless otherwise indicated herein or otherwise clearly contradicted by context. In regard to any of the methods provided, the steps of the method may occur simultaneously or sequentially. When the steps of the method occur sequentially, the steps may occur in any order, unless noted otherwise.

In cases in which a method comprises a combination of steps, each and every combination or sub-combination of the steps is encompassed within the scope of the disclosure, unless otherwise noted herein.

The section headings as used herein are for organizational purposes only and are not to be construed as limiting the subject matter described.

Each publication, patent application, patent, and other reference cited herein is incorporated by reference in its entirety to the extent that it is not inconsistent with the present disclosure. Publications disclosed herein are provided solely for their disclosure prior to the filing date of the present invention. Nothing herein is to be construed as an admission that the present invention is not entitled to antedate such publication by virtue of prior invention. Further, the dates of publication provided may be different from the actual publication dates which may need to be independently confirmed. It is understood that the examples and embodiments described herein are for illustrative purposes only and that various modifications or changes in light thereof will be suggested to persons skilled in the art and are to be included within the spirit and purview of this application and scope of the appended claims.

EXAMPLES

Example 1

A preparation of the disclosed composition was added to a standard Murashige & Skoog tissue culture nutrient media and used for the introduction of Musa sp. explants. The introduction was performed according to standard in vitro introduction protocols for this plant species. Different treatments were used and prepared by adding amounts of the composition of the invention to the culture media which ranged from 0.5% (w/v) to 2% (w/v). After 25 days of incubation at the recommended conditions, it was observed an incidence of microbial contamination of 0%, compared to 27% in the control group. Using 0.5% (w/v) of the preparation of the disclosed composition according to the invention, only 3% of the material evaluated was observed to present signs of microbial contamination. The incidence of the bacterial and fungal infection was greatly reduced in the explants introduced in nutrient media containing the composition, and no new development of the infection was observed during the following steps of the tissue culture process.

Example 2

A solution was prepared by adding one part of the composition to 9 parts of distilled water, to obtain a 10% (w/v) solution. Such a solution was applied to in vitro plants of the Cordyline genus, which were taken from in vitro introductions and transferred to in vitro nutrient media intended for shoot multiplication. The application was done by using a sprayer to coat the surface of the in vitro plants and the method proved applicable and practical. No symptoms of phytotoxicity were observed on the treated in vitro plants. The application of the composition of the invention showed significant increases in the multiplication of the plants, with no signs of microbial contamination.

Example 3

According to one embodiment of the invention, a liquid formulation was prepared to contain 5% (w/v) of the composition of the invention and used as the disinfection solution to prepare explants of a species of bamboo (Guadua angustifolia) prior to the in vitro introduction process. A formulation of the invention was diluted in distilled water to obtain the desired concentration and placed on an ultrasonicator water bath. Explants obtained from plants growing in greenhouse conditions were placed in the water bath and incubated to 15 minutes. Subsequently, the explants were introduced to nutrient culture media under a laminar flow hood. Controls were subjected to a disinfection method using chlorine, as suggested in the literature. A two-fold decrease was observed in microbial contamination at the end of the introduction process in the explants disinfected using the composition of the invention, compared to controls. None of the explants treated with the composition of the invention presented signs of chemical damage.

Example 4

Somatic embryos of Citrus obtained from suspended cell cultures were placed on agar nutrient media containing 1% (w/v) of the composition of the invention. Additionally, the inoculated suspensions were coated with a solution prepared to contain 0.5% (w/v) of the composition of the invention. After the periods and conditions of incubation recommended in the literature, we observed an incidence of microbial contamination 70% lower, compared to controls without the treatment of the composition of the invention, using standard procedures for the technique.

Example 5

Dried seeds of several plant species (including mustard, pumpkin, and radish) were purchased from commercial sources and introduced into standard Murashige & Skoog tissue culture nutrient media prepared with 10% (w/v) of the composition of the invention. The nutrient media was placed in glass vials with no sterilization measures, such as autoclaving. The seeds were placed on the unsterilized nutrient media and incubated using standard growth conditions. The entire introduction process was performed on a non-sterile laboratory bench, without using a laminar flow hood. After 8 days of incubation, over 80% percent of the glass vials showed successful seed germination with no signs of microbial contamination, compared to the controls using media without the addition of the composition of the invention, where 100% of the glass vials showed excessive signs of microbial contamination.

Other objects, features, and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

What is claimed is:

1. A method for reducing or preventing microbial contamination in plants or explants in a tissue culture process, comprising cultivating a plant or explant in a plant tissue culture medium formed from a colloidal silver-based composition comprising:
0.1-20% (w/v) colloidal silver,
1.75-4.38% (w/v) methylvinyl ether copolymer,
0.02-0.099% (w/v) polyoxyethylene octylphenyl ether,
0.02-0.04% (w/v) sodium hydroxide, and
89-95% (w/v) water.

2. The method of claim 1, further comprising pre-treating the plant or explant with the composition.

3. The method of claim 1, comprising applying the composition to a surface of the plant or explant.

4. The method of claim 3, comprising applying the composition as a spray, a mist, or a dropper.

5. The method of claim 1, comprising inoculating the plant or explant in the plant tissue culture medium followed by applying the composition on top of the plant or explant, thereby forming a barrier that protects the plant or explant against said microbial contamination.

6. The method of claim 1, comprising:
about 5.00% (w/v) colloidal silver,
about 3.50% (w/v) methylvinyl ether copolymer,
about 0.099% (w/v) polyoxyethylene octylphenyl ether,
about 0.032% (w/v) sodium hydroxide, and
about 91.36% (w/v) water.

7. The method of claim 1, wherein the water is distilled or deionized.

8. The method of claim 1, wherein the colloidal silver has the following characteristics:

18

(a) it is silver suspended in distilled water and produced by dispersion according to published guidelines (NIST, 2012) or by electrical methods of silver electrodes;
(b) it bas an atomic mass of 107,868 g/mol;
(c) it has a melting point of 960.5° C.;
(d) it has a boiling point of 2000° C.,
(e) it has a density at 15° C. of 10.49 g/mL;
(f) it is not attacked by water or atmospheric oxygen;
(g) it is obscured by ozone and hydrogen sulfide;
(h) it is inert to many acids and reacts easily with dilute nitric acid and hot sulfuric acid; and
(i) it is not sensitive to light in their metallic form.

9. The method of claim 1, wherein particles of colloidal silver have an average particle size of between about 60 nm and about 140 nm.

10. The method of claim 1, wherein at least 50% of particles of colloidal silver have a particle size of between about 60 nm and about 140 nm.

11. The method of claim 1, wherein at least 90% of particles of colloidal silver have a particle size of between about 60 nm and about 140 nm.

12. The method of claim 1, wherein the microbial contamination is caused by fungi or bacteria.

13. The method of claim 12, wherein the fungi are selected from the group consisting of *Blumeria, Sphaerotheca, Phytophthora, Rhizoctonia, Fusarium, Penicillium, Aspergillus Colletotrichum, Botrytis, Magnaporthe, Pythium, Puccinia, Erysiphe, Alternaria, Pseudoperonospora, Plasmodiophora, Sclerotinia, Fulvia, Peronospora, Ustilago,* and *Rhizopus.*

14. The method of claim 12, wherein the bacteria are selected from the group consisting of *Corynebacterium, Bacillus, Staphylococcus, Escherichia, Pseudomonas, Xanthomonas, Erwinia, Clavibacter, Ralstonia, Burkholderia,* and *Agrobacterium.*

15. The method of claim 1, wherein the composition further comprises an acceptable carrier for the tissue culture process.

16. The method of claim 1, wherein the composition further comprises at least one of a second fungicidal agent and a second bactericidal agent.

17. The method of claim 1, wherein the composition is provided in a concentrated form, in a powder form, or in a hydrogel form.

18. The method of claim 1, wherein the composition is prepared by:
(a) placing 89.2-95.7 Kg of water to a 100 L stainless steel vessel;
(b) slowly adding 2.50-6.25 Kg of a colloidal silver concentrate while stirring;
(c) adding 50-120 grams of polyoxyethylene octyl phenyl ether;
(d) adding 1.75-4.38 Kg of methyl vinyl ether copolymer, wherein the methyl vinyl ether copolymer was previously polymerized in a stainless steel vessel containing 1.75-4.38 L of deionized water at 40°° C.;
(e) adding 1 L of a 20-40 g/L sodium hydroxide solution; and
(f) agitating continuously until the resultant mixture becomes transparent.

19. The method of claim 18, wherein the composition is prepared by:
(a) placing 91.4 Kg of water to a 100 L stainless steel vessel;
(b) slowly adding 5 Kg the colloidal silver concentrate while stirring;

(c) adding 99 grams of polyoxyethylene octyl phenyl ether;

(d) adding 3.5 Kg of methyl vinyl ether copolymer, wherein the methyl vinyl ether copolymer was previously polymerized in a stainless steel vessel containing 3.5 L of deionized water at 40° C.;

(e) adding 1 L of a 35 g/L sodium hydroxide solution; and (f) agitating continuously until the resultant mixture becomes transparent.

* * * * *